Jan. 5, 1965    N. E. BATESON    3,164,346
RETRACTABLE STANCHION
Filed May 2, 1962    10 Sheets-Sheet 1
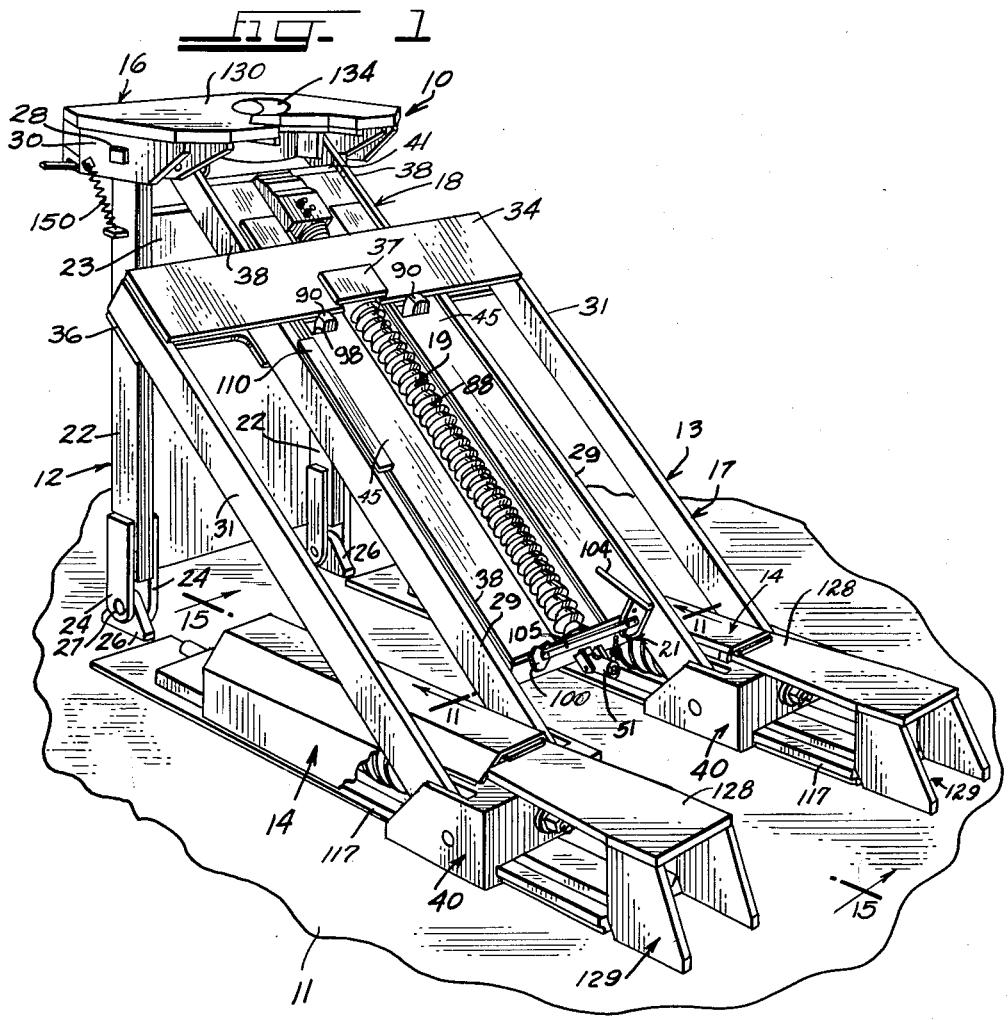
INVENTOR.
NORMAN E. BATESON
BY
Wayne Morris/Russell
HIS ATT'Y.

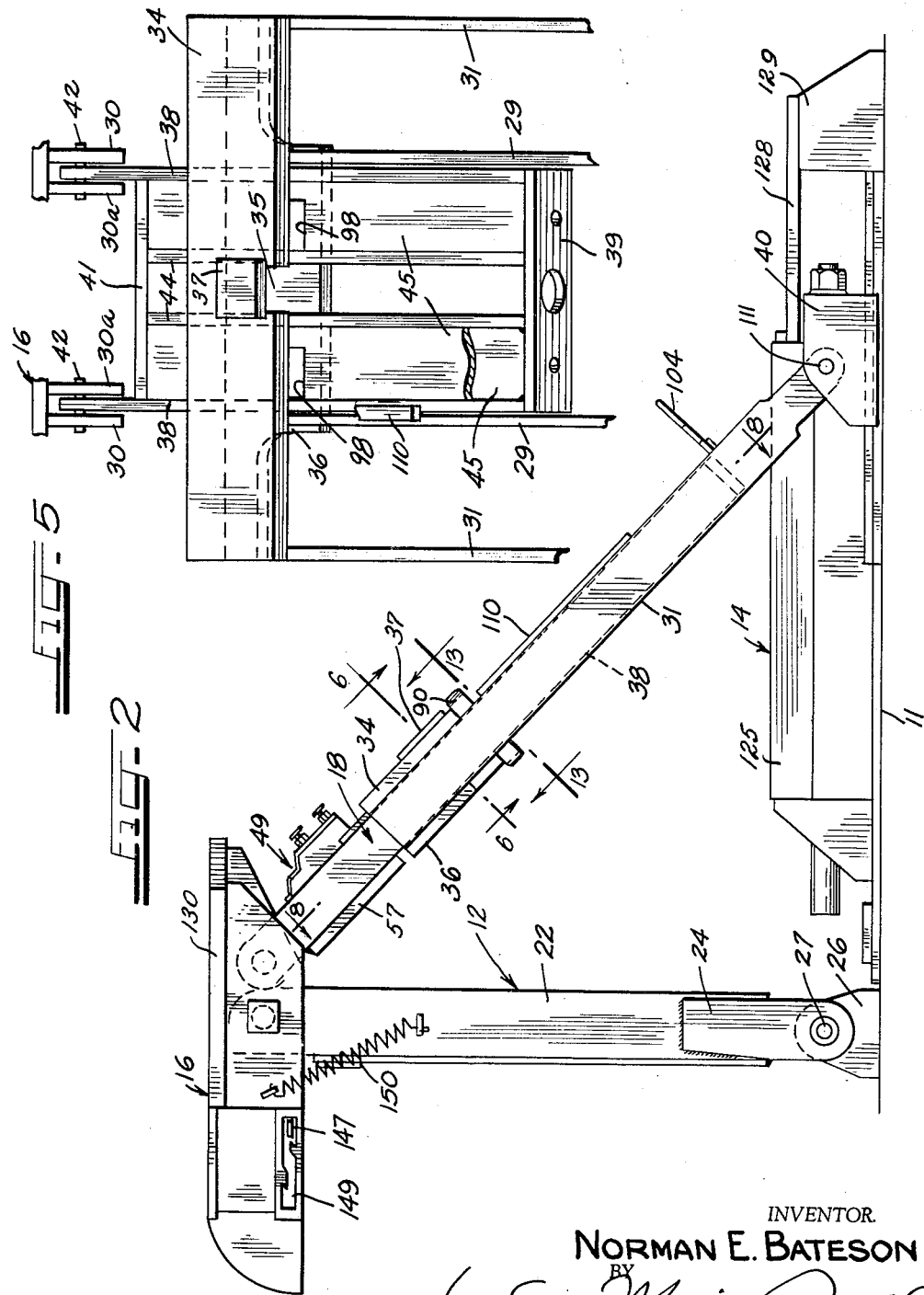

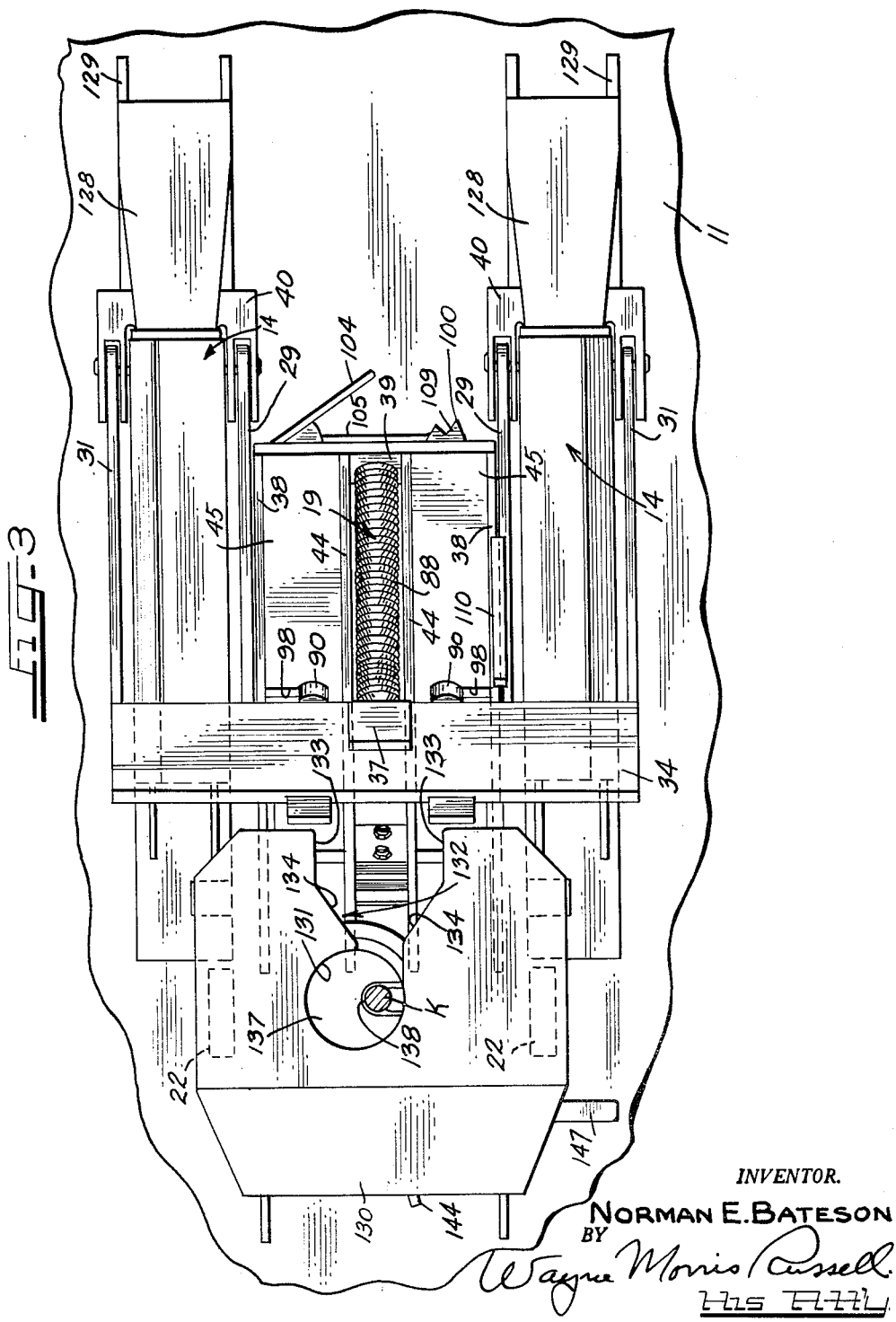

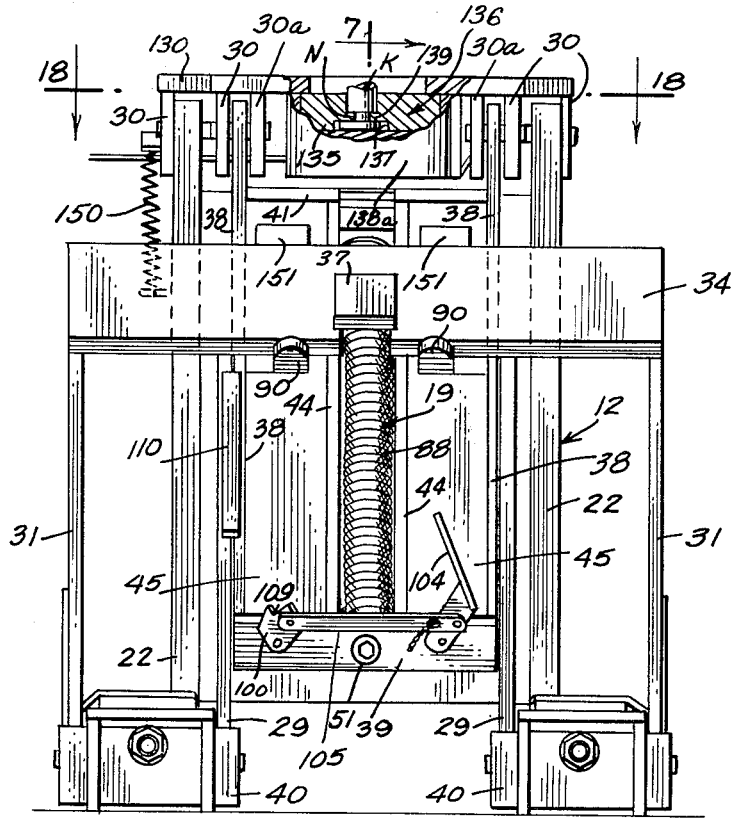
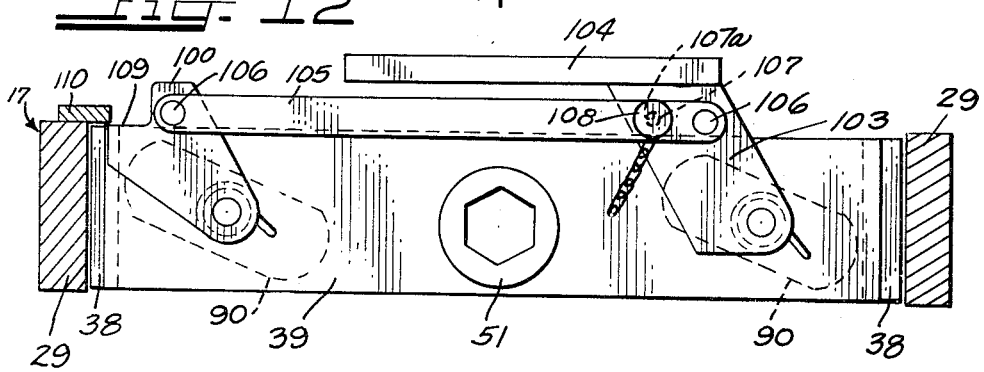

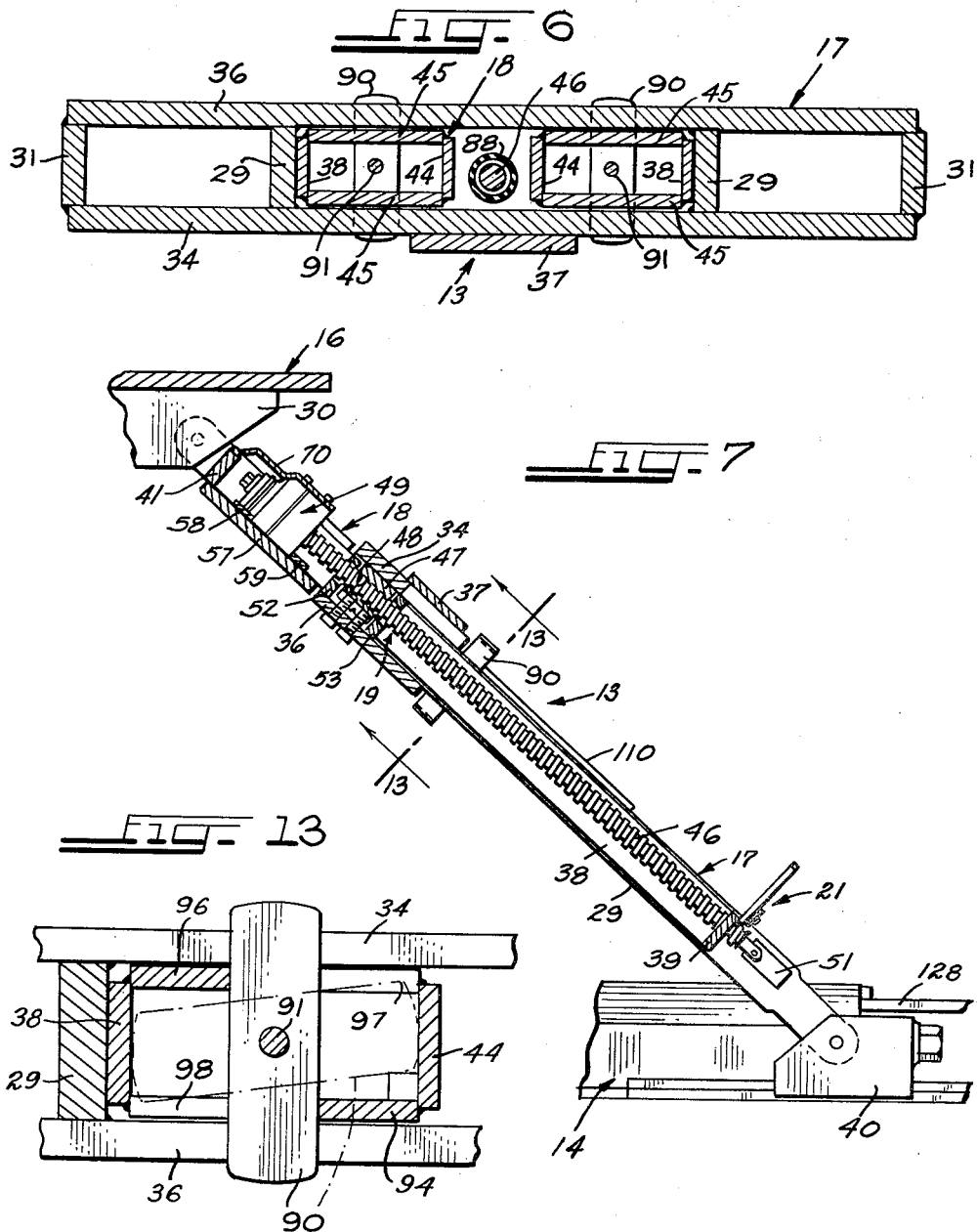

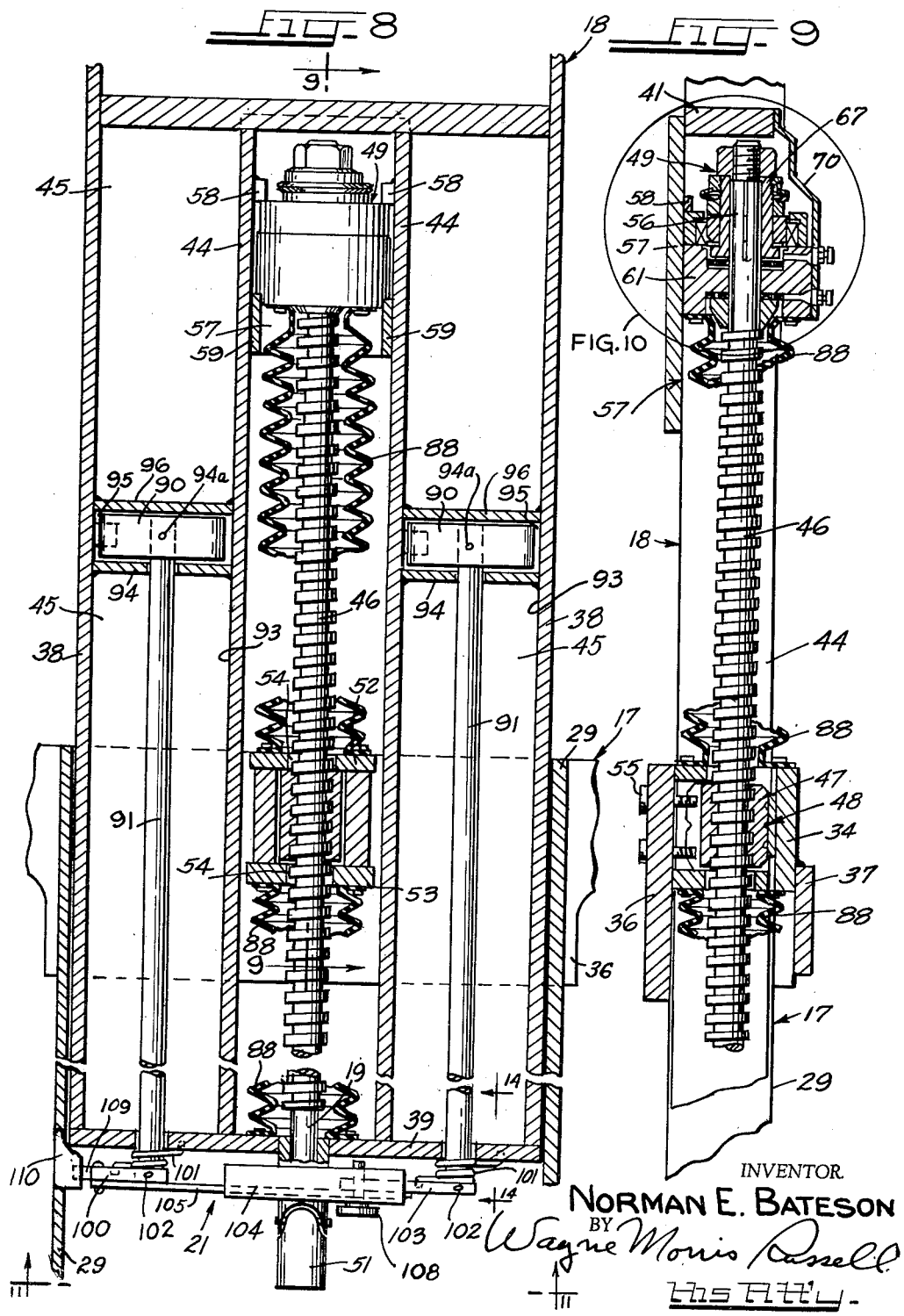

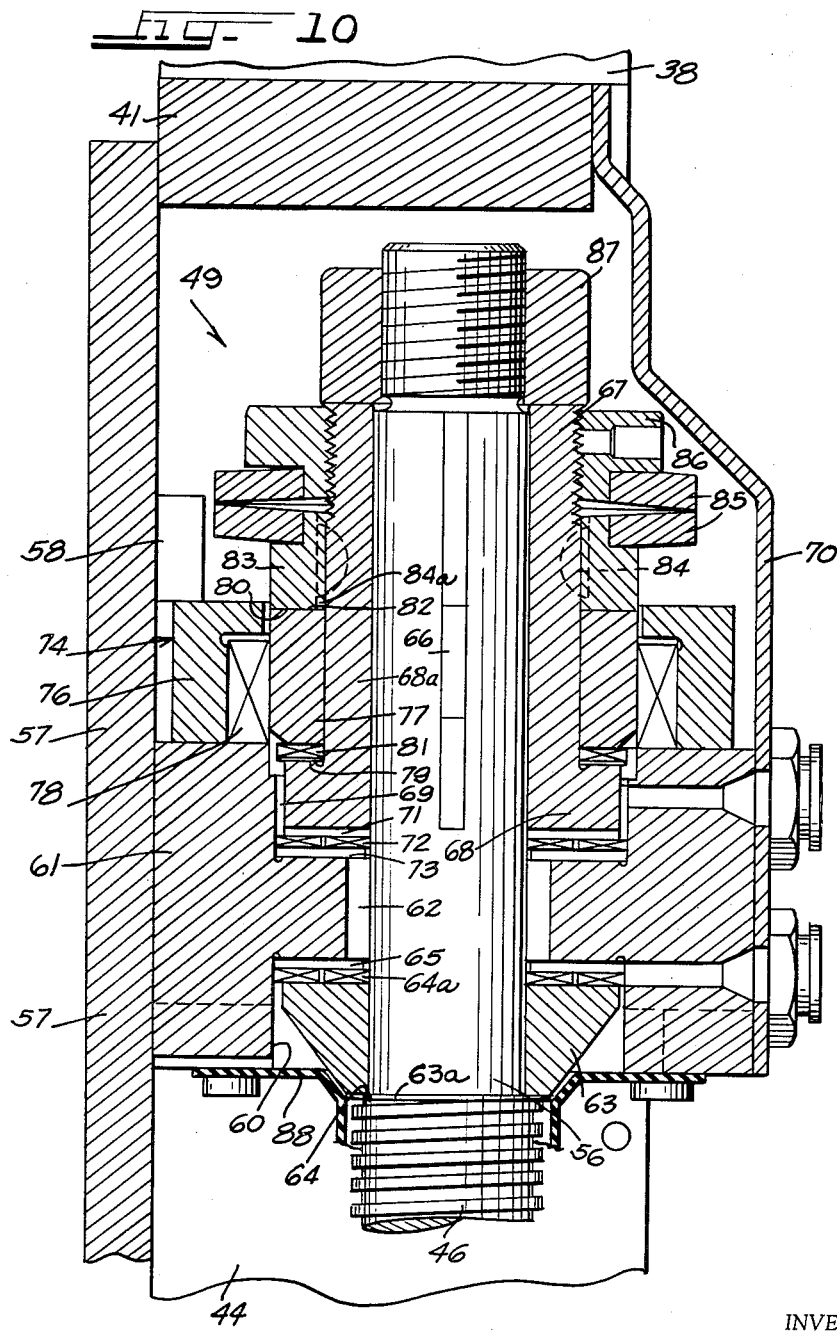

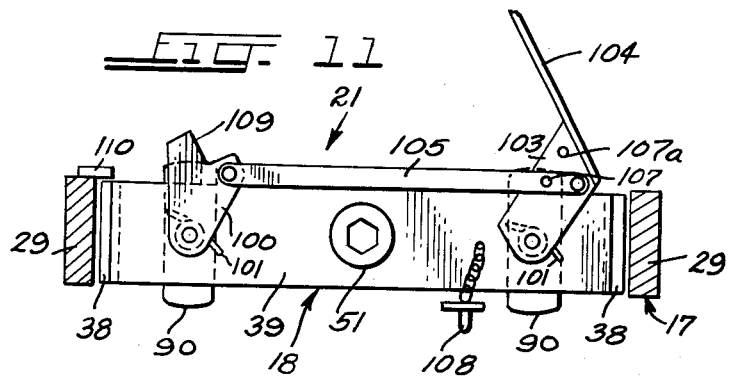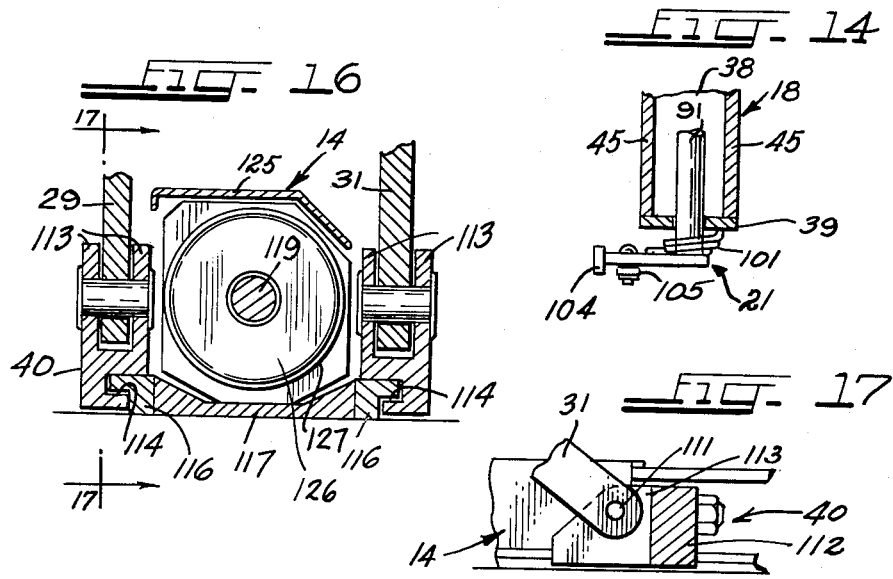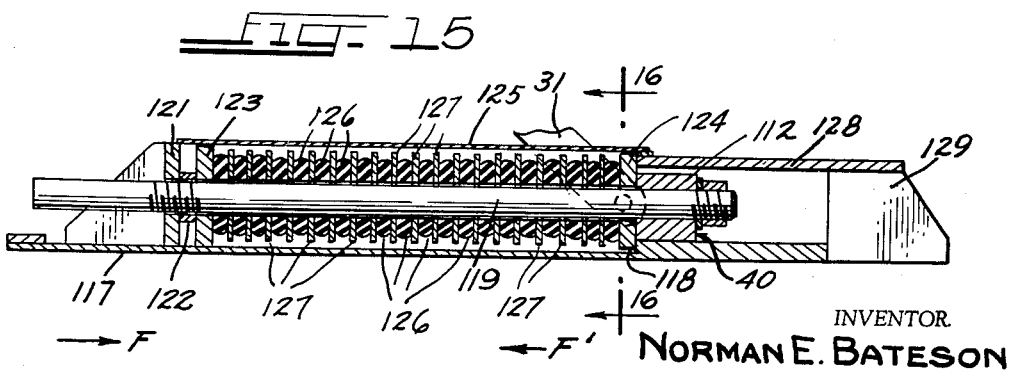

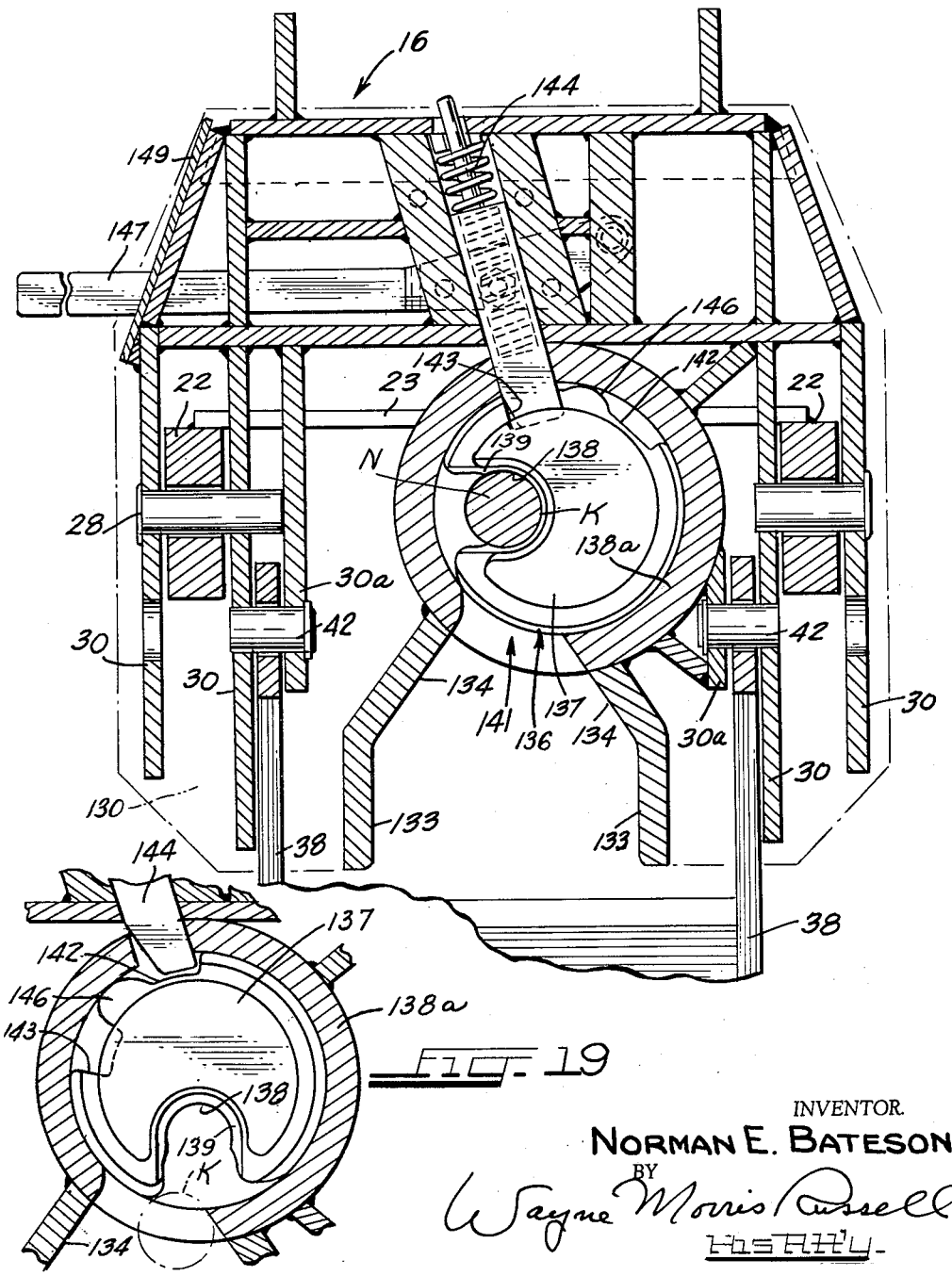

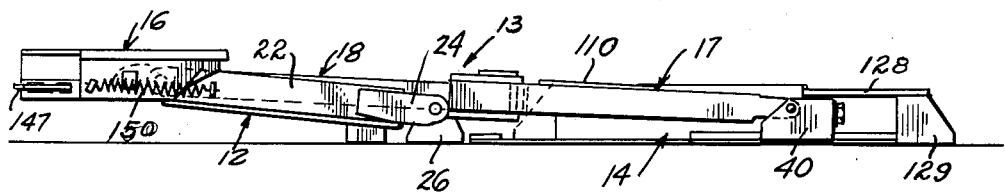
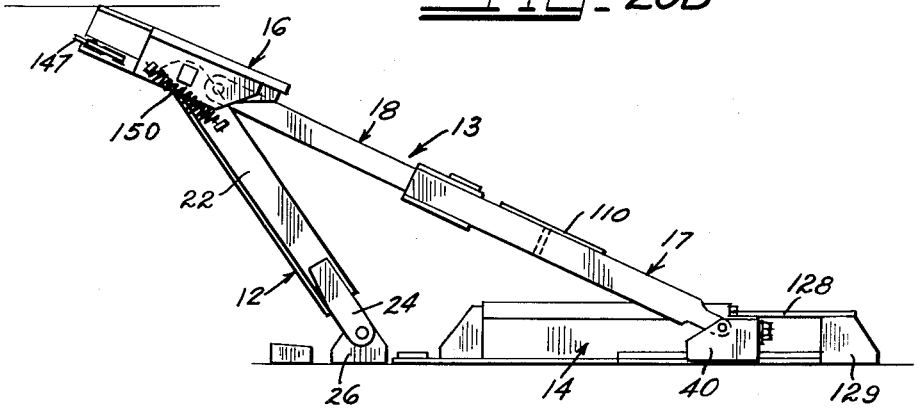
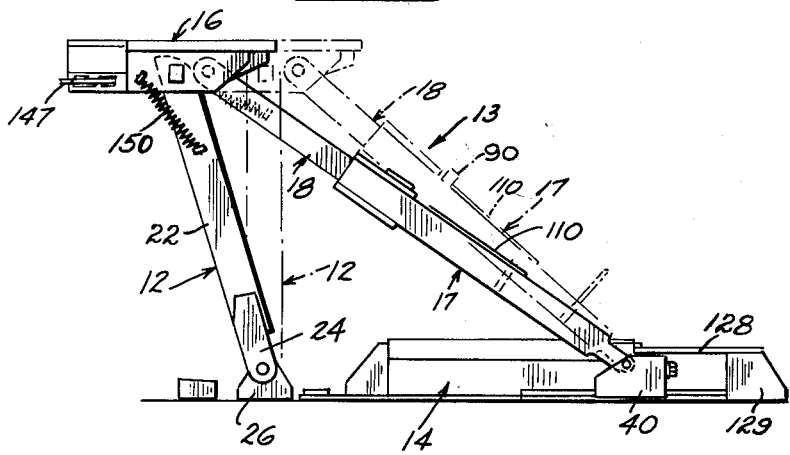

United States Patent Office 3,164,346
Patented Jan. 5, 1965

3,164,346
RETRACTABLE STANCHION
Norman E. Bateson, Munster, Ind., assignor to Pullman Incorporated, Chicago, Ill., a corporation of Delaware
Filed May 2, 1962, Ser. No. 191,976
17 Claims. (Cl. 248—119)

The present invention relates to piggyback railway cars and more particularly to a stanchion employed on such a piggyback railway car supporting and hitching the trailers on the car.

Such stanchions, also commonly referred to as fifth wheel stands, are generally retractable from an elevated operative position supporting and hitching the trailer on the railway car to a retracted position permitting the trailers and tractors to travel thereover during loading and unloading of the trailers.

It is an object of the present invention to provide a new and improved retractable stanchion which may be elevated to its operative position and retracted to its storage position within a minimum length of time requiring the services of a single laborer to operate the same.

It is another object to provide a retractable stanchion having a plurality of struts pivotally connected so as to form in its elevated position a substantially right angular support structure and wherein the diagonal of said triangular support structure is of variable length and includes means selectively operative to increase or decrease the length of the diagonal strut and thereby to position the support in its retracted inoperative storage position or operative support position.

It is a further object, taken in conjunction with the immediately foregoing object, to provide means which are automatically operative to lock said variable length diagonal strut at a fixed length when the strut support structure is in its elevated operative position.

It is a further object to provide a stanchion having a new and improved kingpin latching and support plate engageable in supporting and latching relationship with the kingpin projecting from the underside of the trailer.

Further objects and features will hereinafter appear.

In the drawings:

FIG. 1 is a perspective view of a stanchion constructed in accordance with the present invention;

FIG. 2 is a side elevational view of the stanchion;

FIG. 3 is a top elevational view of the stanchion in its erected operative position;

FIG. 4 is a front elevational view of the stanchion in its operative position with some of the parts being broken away to show underlying details of structure;

FIG. 5 is a fragmentary front elevational view of the stanchion showing the details of the structure of the diagonal strut assembly with the elevating mechanism and locking mechanism associated therewith being omitted;

FIG. 6 is a cross-sectional view taken substantially along the lines 6—6 of FIG. 2;

FIG. 7 is a cross-sectional view of the stand taken substantially along the lines 7—7 of FIG. 4;

FIG. 8 is a fragmentary cross-sectional view of the diagonal strut assembly showing the elevating mechanism and the latching mechanism, the upper diagonal and lower diagonals of the diagonal strut assemblies being shown in an extended position wherein said stanchion is located between its fully collapsed or retracted and elevated operative position as shown in FIG. 1;

FIG. 9 is a cross-sectional view taken substantially along the lines 9—9 of FIG. 8;

FIG. 10 is an enlarged fragmentary view taken in the encircled portion of FIG. 9, showing the details of the clutching arrangement employed with the elevating mechanism;

FIG. 11 is a cross-sectional view taken substantially along the lines 11—11 of FIG. 8, showing the latching mechanism in its locked position;

FIG. 12 is similar to FIG. 11, but showing the latching mechanism in its unlatched position assumed when the stanchion is in its retracted or lowered positions;

FIG. 13 is a view taken substantially along the lines 13—13 of FIG. 2 and showing in phantom lines the position of the locking lug in its unlocked or unlatched position;

FIG. 14 is a cross-sectional view taken substantially along the lines 14—14 of FIG. 8;

FIG. 15 is a cross-sectional view taken substantially along the lines 15—15 of FIG. 1;

FIG. 16 is a cross-sectional view taken substantially along the lines 16—16 of FIG. 15;

FIG. 17 is a cross-sectional view taken substantially along the lines 17—17 of FIG. 16;

FIG. 18 is a cross-sectional view taken substantially along the lines 18—18 of FIG. 4;

FIG. 19 is a fragmentary cross-sectional view showing the kingpin locking jaw in its normal kingpin receiving position; and FIGS. 20A, B, and C are schematic side elevational views showing the stanchion in its retracted, intermediate, and elevated positions, respectively.

Referring now to the drawings, the stanchion 10 of the present invention is shown attached to a deck 11 of a railway car of the type generally designated as a flat car which is particularly suitable for piggyback transporting of trailers. It is to be understood, of course, that the stanchion 10 of the present invention may be employed with different types of railway cars such as, for example, skeleton type, cushion rack type, and modified cars of the previously mentioned types without changing the principles of the present invention. Under some circumstances it may be necessary to provide the stanchion illustrated with a separate base plate so that the stanchion 10 is in the form of a unitary device including the base plate which may be suitably fixed to the car structure.

As shown particularly in FIGS. 1–4, the stanchion includes generally an upright strut 12 pivotally fixed at one end to the deck 11 which provides, in the embodiment shown, the stanchion base 11, a diagonal strut assembly 13 pivotally connected at its lower end to the base 11 by way of a cushion arrangement 14, and a support plate assembly 16 engageable with the underside of the trailer and adapted to encompass in releasable locking engagement the trailer kingpin K depending from the underside of the trailer.

The diagonal strut assembly includes a lower diagonal strut 17 and an upper diagonal strut 18 which are telescopingly movable relative to each other by way of an elevating assembly 19. The elevating assembly 19 is operative upon selective turning thereof to lengthen or shorten the effective length of the diagonal strut assembly 13 so as to position the stanchion 10 in its elevated trailer-supporting position as shown in FIG. 1 or its retracted position wherein the stanchion is disposed adjacent to the deck 11 so as to provide clearance between the tractors and trailers passing thereover during loading and unloading of the railway car. Associated with the upper and lower diagonal struts 17 and 18 is a releasable latching mechanism 21 which is operative when the stand is in its operative position to lock the struts 17 and 18 at fixed lengths so as to preclude the collapse of the stand and to relieve the elevating mechanism 19 from the stresses associated with the operation of the device and the car during transit.

The upright strut 12 includes a pair of transversely spaced struts 22 which may be formed of bar stock of substantially rectangular section. Reinforcing the struts 22 is a reinforcing plate 23 welded across the lateral sides of the struts 22. Depending from each of the lower ends of the struts 22 is a pair of pivot brackets 24 which encompass a pivot block 26 fixed to the base or deck 11. Pivotally connecting the pivot brackets 24 to the pivot block 26 is a pivot pin 27. The upper ends of each of the struts 22 are pivotally connected between pairs of spaced bracket plates 30 depending from the underside of the support assembly 16 as by a pivot pin 28.

The lower diagonal strut 17, as shown particularly in FIGS. 1–6, includes transversely spaced inner legs 29, outwardly of which there are transversely spaced outer legs 31. The outer and inner legs 29 and 31 are aranged in pairs, of which the lower ends of each of the pairs of legs 29 and 31 are pivotally attached to a bracket 40 which, in the form of invention illustrated, is associated with the cushioning arrangement 14, as more fully to be explained hereinafter. Spanning and fixed across the upper ends of the pairs of legs 29 and 31 are top and bottom plates 34 and 36, respectively. The top plate 34 is provided with a rectangular cut-out 35 along its lower edge intermediate the inner legs 29. Overlying the cut-out 35 is a cover plate 37.

The upper diagonal strut 18 includes a pair of transversely spaced strut members 38 connected across their lower ends by a tie plate 39 and along a line spaced from the upper ends by an upper tie plate 41. The upper ends of each of the strut members 38 are pivotally connected by way of a pin 42 between respective pairs of depending bracket flanges 30 and 30a provided on the underside of the support plate assembly 16. Extending between the top and bottom tie plates 41 and 39 are transversely spaced vertical reinforcing plates 44 between which there is accommodated the stanchion elevating mechanism 19. Spanning the top and bottom of adjacent pairs of the strut members 38 and vertically reinforcing members 44 are horizontal plates 45.

As shown in particular in FIGS. 7, 8, 9, and 10, the stanchion elevating mechanism 19 includes generally a screw member 46 supported by way of a ball-nut 47 fixed in a housing 48 provided in the lower diagonal strut 17 and connected adjacent its upper end by means of a braking mechanism 49 to the upper diagonal strut 18.

The screw member 46 is formed with an intermediate threaded portion, preferably formed of Acme threads, for the major portion of its length. Adjacent its lower end, the screw 46 is provided with a reduced end portion to which there is pivotally connected for movement in a vertical plane a power tool receiving socket member 51.

The ball-nut 47, as above described, is supported in a housing 48 formed by a pair of vertically spaced horizontal plates 52 and 53 fixed between the top and bottom plates 34 and 36 spanning the lower diagonal strut members 29 and 31. The plates 52 and 53 are provided with coaxially aligned openings 54 accommodating the diameter of the screw 46. The ball-nut 47 is secured against rotation within the housing by way of bolts 55, as shown in FIG. 9.

As heretofore described, the braking unit 49 is mounted on a reduced end 56 formed on the upper end of the screw 46. The braking unit is operative to prevent the screw from reversing its direction of turning so as to preclude the inadvertent collapse of the stanchion during the period it is being elevated and when it is in its elevated position. The braking unit 49 is secured to the upper diagonal 18, and is supported between the vertical reinforcing plates 44 by a support plate 57 fixed to span the reinforcing plates 44. Maintaining the braking unit 49 fixed to the support plate 57 and the vertical supporting plates 44 are stops 58 and 59 fixed to the former in a manner to securely clamp the unit 49 on the upper diagonal 18.

The braking unit 49 (FIG. 10) includes a housing block 61 fixedly secured between the reinforcing plates 44 and to the spanning plate or support plate 57. The housing block 61 is formed with an axial opening 62 which is larger than the diameter of the reduced end 56 of the screw member 46 extending therethrough. Seated in a recess 60 formed on the bottom side of the housing block 61 is a load-bearing collar 63 receiving the reduced end 56 and engaging at its lower end face a washer 63a abutting a shoulder 64 formed on the screw 46. Disposed between the wall of the recess 60 and the upper end face of the collar 63 are inner and outer needle thrust bearings 64a and 65, respectively. Fixed to the reduced end 56, as by radially spaced keys 66, is an upper load-bearing collar 67 having a lower enlarged end 68 received within an upper recess 69 formed in the housing 61. A thrust race 71 is provided on the end face seating within the recess 69 and disposed between the thrust race 71 and the bottom wall of the recess 69 are inner and outer thrust needle bearings 72 and 73.

Mounted on the reduced end portion 68a of the load-bearing collar 67 is a one-way clutch 74 of the sprag type. The sprag clutch 74 includes an outer race 76 fixedly secured between the stop 58 and the housing 61 and an inner race 77 rotatably mounted about the reduced end portion 68a of the load-bearing collar. The sprag clutch elements 78 disposed between the inner and outer races 77 and 76, respectively, are of typical and conventional structure permitting relative rotation of the inner and outer races in one direction only. Disposed between the bearing race 79 formed on a shoulder of the bearing collar 67 and the lower end of the inner race 77 is a needle thrust bearing 81.

Bearing and frictionally engaging the upper end surface 82 of the inner race 77 is a friction collar 83. The friction collar 83 is keyed to the bearing block 67. As shown, the friction collar is provided with slots 84a which receive the key members 84 so that the collar 83 is longitudinally slidable relative to the inner race 77.

Resiliently urging the friction collar 83 toward the inner race so as to control the friction of the face 82 with the upper face 80 of inner race 77 is a pair of Belleville washers 85. Threadably secured on the bearing block 67 is a nut 86 which serves to control the tension of the Belleville springs on the bearing collar 83. For holding the bearing collar 83 and the assembly above described on the reduced end of the shaft 56, a nut 87 is threadably fastened to the terminal end of the shaft 46. Overlying the clutch assembly 49 is a cover plate 70 suitably secured to the vertical reinforcing members 44 along its sides and to the cross piece 41 along its upper edges. Disposed between the brake assembly and the upper end of the ball-nut housing and also between the lower end of the latter and the cross piece 39 of the lower diagonal strut 17 are flexible screw covers 88 which are expansible and contractible and serve to protect the screw.

Assuming that the screw thread formed on the screw 46 is of the right-hand type such that upon applying clockwise turning to the screw at the socket 51 causes the upper diagonal 18 and the lower diagonal 17 to be telescoped inwardly relatively to each other to shorten the effective length of the diagonal strut assembly and thereby to elevate the stand, the turning of the screw 46 causes the bearing block 67 keyed to the shaft to also rotate clockwise. Simultaneously, the friction collar 83 keyed to the bearing block 67 also rotates and due to the action of the Belleville springs 84 which have been previously adjusted to maintain the desired coefficient of friction between the bearing surfaces 82 on the friction collar and the surface 80 of the inner race 77 of the sprag clutch 74, the inner race 77 also rotates clockwise due to the relative positions of the sprag devices 78 which are arranged to permit free rotation in a clockwise direction only relative to the outer race 76. Should, however, the power for turning the screw 74 be released prior to the time that the stanchion 10 is in a locked elevated position, as more fully described hereinafter, the friction between the bearing faces 80 and 82 is such as to maintain the friction collar 83 and inner race 77 as a substantially unitary structure so that counter-clockwise movement of the screw is precluded by the action of the sprag element 78 which prevents relative turning of the inner race 77 with respect to the outer race 76 in a counter-clockwise direction. From the foregoing, it should be readily apparent that the Belleville springs are adjusted to maintain the bearing faces 80 and 82 in sufficient frictional contact to prevent the weight of the stanchion from causing relative movement between the faces.

To lower the stand to its retracted position, the screw 46 is turned counter-clockwise and sufficient torque is applied to break the frictional contact between the friction collar 83 and inner race 77 so as to permit relative movement therebetween whereby the shaft 46 is operative to extend the upper diagonal 18 outwardly with respect to the lower diagonal 17 to lower the stanchion.

As best shown particularly in FIGS. 8, 11, 12, 13, and 14, the latching mechanism 21 for holding the stanchion locked in its upright position includes a pair of spring biased locking lugs 90 arranged so that when the stanchion 10 reaches the erected position, the lugs 90 are operative to lock the upper diagonal strut 18 with respect to the lower diagonal strut 17 and thereby prevent further telescoping movement of the two.

As shown, there are two such locking lugs 90. The lugs 90 are carried by shafts 91 located in the compartments 93 formed in the lower diagonal strut assembly 17. The shafts 91 are each journaled at their lower ends in the cross braces 39 extending between the strut legs 38 and journaled adjacent their upper ends in a cross piece 94 disposed across each of the compartments 93 between the cross braces 38 and vertical reinforcing plates 44. The locking lugs 90 are each suitably fastened for movement with the respective shaft 91 by way of a pin 94a and are located so as to fit in an enclosure 95 defined by the partitioning plates 94 and top partitioning plates 96. Formed in the upper and lower horizontal plates 45 spanning the respective pairs of strut legs 38 and vertical reinforcing members 44 and overlying the compartments 95 are slots 97 and 98, as best shown in FIG. 13. The slots 98 and 97 are arranged to permit turning of the locking lugs 91 from the phantom line position shown wherein the lugs 90 are disposed within the lug compartments 95.

The shafts 91 and the locking lugs 90 fixed for movement therewith are biased toward a locked position, as shown in FIGS. 8, 11 and 14, by way of a spring 101 encircling the lower ends of the shafts 91. The biasing spring 101 of the left hand shaft 91, as viewed in FIG. 8, is fixed at one end to the cross brace 39 and at the other end to a latching member 100 fixed to the end of the shaft 91 by a pin 102. The biasing spring 101 on the right shaft 91 is fixed to the cross brace 39 at one end and at its other end to a plate member 103 forming part of the handle 104. The plate or latch member 100 is fixed to the lower end of the left shaft 91 similarly as by a pin 102. The latch member 100 and the handle 104 (FIGS. 8, 11, and 12) are connected by a link 105 pivotally connected at one end to the latch 100 and at its other end to the plate 103 by pivot pins 106.

For retaining the locking lugs 90 in their unlocked or unlatched position within the compartments 95, the handle 104 is depressed to the position shown in FIG. 12. In this position, openings 107 and 107a provided in the link 105 and the handle plate member 103, respectively, are aligned and receive a lock pin 108 so as to maintain the handle 104 depressed against the action of the springs 101.

In operation, the lock pin 108 is removed so that the handle 104 and locking spuds 90 are subject to the action of springs 101 biasing the locking spud shafts 91 clockwise as viewed in FIG. 12. To preclude movement to the locked position shown in FIG. 11 during elevation of the stand, a notch 109 is formed on the latch 100 which is arranged to underlie a stop plate or latching plate member 110 fixed to the inner diagonal strut 29 of the lower diagonal strut assembly 17. The stop or lock plate 110 is of such length and located so as to overlie and remain in engagement with the notch 109 of the latch 100 until the upper diagonal strut 18 moves inwardly to locate the spud 90 between the upper and lower reinforcing plates 34 and 36 of the lower diagonal strut 17. During the period in which the upper diagonal strut 18 moves inwardly and the spuds 90 are located between the upper and lower horizontal plates 34 and 36 of the lower diagonal strut 17, the locking spuds 90 remain substantially in the position shown in FIG. 12 until they clear the lower edges whereupon the spring biasing means is free to simultaneously turn the shafts 91 and thereby the stop lugs or locking lugs 90 fixed thereto to their operative position in the slots engaging the bottom edge of the upper and lower plates 34 and 36 so as to preclude further telescoping movement of the upper diagonal with respect to the lower diagonal in either direction. To release the locking spuds 90, the handle 104 is moved inwardly and the lock pin 108 is inserted into the openings 107 and 107a provided in the handle plate 103 and link 105 so as to retain the locking spuds 90 within the confines of the compartment as shown in phantom lines in FIG. 13.

Referring now in particular to FIGS. 15–17, the lower ends of the respective pairs of strut legs 29 and 31 of the lower diagonal strut 17 are connected to respective ones of the pivot blocks 40, as by pins 111. In the embodiment shown, the pivot blocks 40 are associated with the cushioning devices 14. However, in the event that the stanchion is employed with other types of railway cars, such as the cushion rack type wherein the rack is cushioned from the underframe in the well-known manner, the cushioning devices 14 may be omitted and the brackets 40 may be directly attached to the rack.

As shown in particular in FIGS. 16 and 17, the pivot brackets 40 comprise essentially a U-shaped bracket including a bight portion 112 from which there extends pairs of spaced legs 113 between which the legs 31 and 29 are disposed and pivotally attached as by pivot pins 111. The brackets 40 are each formed on their underside with slots 114 which receive the slide members 116 formed on each side of the base members 117 supporting the cushioning devices 14.

The cushion device base members 117 each comprise essentially a flat plate formed along the inboard end thereof with a shoulder 118 which serves to provide a stop for the cushioning means as more fully to be explained hereinafter. It is to be noted that the bight portion 112 of the brackets 40 is constructed so as to clear the shoulders 118 on the base plate 117 to permit sliding movement thereover.

The cushioning means 14 each include a shaft 119 of which one end is slidably supported in the bracket bight portion 112 and the other end is slidable in a support bracket 121 fixed to the base plate 117 adjacent the outboard end thereof. Fixed inwardly of the slidable end of the shaft 119 supported in the bracket 121 is a stop collar 122 which abuts the inboard face of the support bracket 121. Slidably disposed on the shaft 119 between the bracket 40 and the stop collar 122 are follower plates 123 and 124 between which there is disposed a plurality of resilient cushioning pads 126 separated by metallic discs 127. The cushioning devices 14 may be provided with covers 125.

In the neutral position shown, the follower 124 engages the bight portion 112 of the bracket 40 and abuts the shoulder 118 and a stop 128. The stop 128 may be in the form of a plate fixed across the upper edges of a supporting bracket 129. The leading edge of the plate 128 abuts the follower 124 along the top edge thereof. The follower 123 abuts the stop collar 122 which abuts the inboard side of the support 121.

The cushion arrangement as shown serves to reduce the shock of impact imparted to the trailer hitched to the stanchion and the cargo carried by the trailer. In operation, should an impact force F (FIG. 15) be applied at the left end of the underframe of the railway car in the direction illustrated, the cushioning device bases 117 fixed to the underframe simultaneously move in the same direction and the pivot brackets 40 slidable relatively to the base remain substantially stationary primarily due to the inertia of weight of the trailer and the cargo carried therein. The shafts 119 and the stop collars 122 abutting the bracket 121 fixed to the base 117 and against the followers 123 move in the direction of the force and are operative to compress the resilient cushions 125 slidably mounted on the shaft against the follower 124 which is held fixed or stationary by way of its abutting engagement with the stationary pivot brackets 40. In this manner, the cushioning devices 14 are operative to resist the force of impact.

Should a force be applied at the right in the direction of the arrow F', the pivot brackets 40 remain stationary and the shaft 119 also remains stationary because of the nut 122 engaging the pivot brackets 40. At the same time, the stop 128 and shoulders 118 engaging the followers 124 and fixed to the underframe or base 11 for movement therewith compress the cushion pads 126 against the follower plates 123 abutting the stop collars 122 fixed to the stationary shafts 119.

The kingpin support plate assembly and hitching arrangement 16, as shown in particular in FIGS. 3, 4, 18, and 19, includes a top plate 130 having a kingpin accommodating opening 131 located substantially in the center thereof. The kingpin accommodating opening 131 communicates with an entry slot 132 formed along the forward edge thereof. The entry slot 132 is formed along the forward edge of the top plate 130 to provide substantially parallel sides 133 joining inwardly converging sides 134 formed to guide the trailer kingpin into the opening 131 and into engagement with the coupler locking mechanism 136.

The coupler locking mechanism 136 includes a locking jaw 137 turnably mounted in a locking jaw housing 138a depending from the underside of the support or top plate 130. The coupler locking jaw 137 is formed with a substantially U-shaped opening 138 contoured to accommodate the diameter of the trailer kingpin K which is formed with a reduced neck portion N intermediate its length. To retain the kingpin locked in the jaw against upwardly lifting away from the support plate, the locking jaw opening 138 is formed with an intermediate flange portion 139 which is adapted to encompass the reduced neck N of the kingpin K.

As shown, the housing 138a is also formed with the entry opening 141 located complementary to the plate entry slot 132. It is to be observed that the centerline of housing entry 141 and plate entry 132 are located so as to communicate with the kingpin accommodating opening on one side of the longitudinal center line of the latter. Thus, the kingpin K, as shown in FIG. 19, engages one side of the jaw opening 138 as it enters through the entry openings 141 and 132 to rotate the jaw 137 clockwise to the position shown in FIG. 18, wherein the device is operative to retain the kingpin locked.

For providing a positive lock, the periphery of the kingpin jaw 137 is provided with a camming surface 146 including a pair of locking indentations 142 and 143 for receiving a spring-depressed plunger 144. As shown in FIG. 18, in the unlocked or unlatched position, the spring-depressed plunger 144 is engageable in a slot 142. Upon turning of the jaw, the plunger 144 is moved outwardly by way of the camming surface 146 and is spring-urged into the notch 143 when the jaw 137 turns to the locked position shown in FIG. 18. In this manner, the plunger 144 is operative to preclude turning of the locking jaw in either direction so as to maintain the kingpin K locked to the support plate assembly 16.

Associated with the plunger 144 is a latch handle 147 pivotally connected at one end to the underside of the support plate 16 and between its ends to the plunger 144. The other end of the latching handle extends outwardly of the sides of the support plate assembly 16 extending through a latching plate 148 fixed along the side of the support plate assembly 16 as shown in FIG. 2. The latching plate is formed with a suitable zig-zag slot 149 permitting movement of the latching handle 147 with the plunger as the latter is actuated during turning movement of the jaw 137 to its locked position. During such movement, the latch handle 147 moves to a locked position requiring that the latch handle 147 be depressed and moved to its original position, whereby the plunger 144 is retracted out of the locking notch 143 permitting free movement of the jaw 137 in a counterclockwise direction to its kingpin release position shown in FIG. 19.

Referring now to FIGS. 20A, B, and C, the stanchion 10, as shown in FIG. 20A, is in its retracted position adjacent the deck or base 11 of the railway car. In the retracted position there is adequate clearance for the tractors and trailers to pass thereover during unloading and loading of the trailers on the flat car. The diagonal strut assembly 13 is in its extended position so that the upright strut 12 is supported adjacent the floor with the support plate assembly 16 extending toward the outboard end of the car. The locking jaw 137 and the latching handle 147 are arranged so that the jaw 138 is in the kingpin receiving position shown in FIG. 19. The locking spuds 90 are normally positively held in their confined position within the respective compartments 95, as shown in FIG. 12, by the lock pin 108 extending through the openings 107 and 107a located in the link member 105 and the handle plate member 103. Further holding the locking spuds 90 in the compartments 95 is the locking plate 110 which seats within the notch 109 of the latch 100 fixed to the lower end of the left shaft 91 carrying the locking spud 90 and to the handle member 104 fixed to the right spud shaft 91 by way of the connecting link 105.

To raise the stanchion 10, the lock pin 108 is removed. However, the latch or lock plate 110 overlying the notch 109 precludes the springs 101, associated with the locking spud shafts 91, from being effective to rotate the locking spuds 91 to their operative position. Thereafter, a power tool, which may be of the pneumatic type, is inserted into the power socket 51 of the elevating mechanism to rotate the latter clockwise to telescope the upper diagonal strut 18 inwardly relatively to the lower diagonal strut 17. Such shortening of the effective length of the diagonal strut assembly 13 causes the upright struts 22 to pivot clockwise about the pivot brackets 30 and thereby raise the stand.

As heretofore described, the braking mechanism 49 associated with the screw 47 of the elevating mechanism 19 is operative to prevent the screw 47 from reversing its direction of rotation in the event that the power drive is temporarily disconnected. During the elevation of the stanchion 10, the locking spuds 90 continue to remain in their inoperative positions because the locking plates 110 remain in engagement with the latch 100 movable with the upper diagonal strut 18.

Upon reaching substantially the elevation shown in FIG. 20C in the full line position, the upper diagonal strut 18 is telescoped inwardly relatively to the lower diagonal 17 to the extent that the spud latch 100 clears the lock plate 110 whereupon the springs 101 are free to bias the spuds to their locked position. However, in this position the top and bottom cross plates 34 and 36 of the lower diagonal 17 overlie the locking spuds 90 such that the latter are not free to turn to the locked position until the stanchion is raised to its operative position shown in phantom. In this position, the spuds 90 are engageable with the bottom edges of the cross plates 34 and 36 and preclude extension of the upper diagonal strut 17 relatively to the lower diagonal. To preclude further inward telescoping of the upper diagonal strut 18, the latter may be provided with suitable stops, such as stop plates 151 as shown in particular in FIG. 4, which are engageable with the upper edges of the horizontal cross plates 34 and 36 of the lower diagonal 17.

As the stanchion moves from the full line to phantom position shown in FIG. 20C, the support plate 16 is urged toward a substantially horizontal position by way of a spring 150 fixed thereto and to the upright strut 12. The kingpin entry slots 132 and 141 of the plate assembly 16 are thus substantially aligned with the kingpin K depending from the underside of the trailer, which has been previously located on the railway car. The kingpin K is guided through the entry slots 132 and 141 and engaged within the opening 138 in the locking jaw 137 so as to rotate the latter clockwise to the locked position shown in FIG. 18. At the same time, as heretofore explained, the coupler jaw unlatching handle 147 is automaticaly moved to a locked position. In this manner, the trailer is securely hitched to the car.

To release the trailer from the stanchion, the latching handle 147 is moved to its unlatched position so that the locking plunger 144 is retracted from locking engagement with the coupler jaw 137 as previously explained, to permit free rotation of the locking jaw to its release position. Prior to lowering the stanchion, the diagonal strut locking spuds 90 are urged toward their inoperative positions by depressing the handle 105 and seating the lock pin 108 in the aligned openings 107 and 107a and thereby retaining the spuds 90 inoperative. Thereafter a power tool is introduced into the socket 51 and the stand lowered to its retracted position shown in FIG. 20A. During such lowering, the locking jaw 137 is moved out of engagement with the kingpin K and rotates counter-clockwise to its release position.

What is claimed is:

1. A stanchion adapted to be fixed on a railway vehicle for supporting and hitching trailers thereon, said stanchion comprising a support plate assembly, a vertical strut member of substantially fixed length, a diagonal strut means including an upper diagonal strut member and a lower diagonal strut member movable lengthwise relatively to each other, first pivot means pivotally supporting the lower end of said vertical strut member on said railway vehicle, second pivot means spaced lengthwise from said first pivot means and pivotally supporting the lower end of said lower diagonal strut member on said railway vehicle, said support plate assembly being pivotally connected to the upper ends of said vertical strut member and said upper diagonal strut member, and means connected between said upper and lower strut members for lengthening and shortening the effective length of said diagonal strut means so that upon lengthening thereof said vertical strut means is disposed in a substantially horizontal position and upon shortening thereof said vertical strut means is disposed in a substantially erect vertical position, said vertical member and said diagonal strut means forming a substantially right triangular support for said support plates in the substantially erect vertical position of said vertical strut.

2. The invention as defined in claim 1 wherein locking means are disposed between said upper diagonal strut means and said lower diagonal strut means for preventing lengthening of said diagonal strut assembly when said support structure is in the operative trailer supporting position thereof.

3. The invention as defined in claim 1 wherein said means for lengthening and shortening said effective length of said diagonal strut assembly comprises a screw drive.

4. The invention as defined in claim 3 wherein said screw drive includes braking means operative during rotation of said screw drive for shortening said effective length of said diagonal strut assembly to preclude reversal of said screw drive when said driving torque rotating said screw is terminated and further includes means for over-riding said brake means upon the application of a reversely applied torque so that said diagonal strut may be lengthened.

5. The invention as defined in claim 1 wherein cushioning means for absorbing the shock of impact are connected to said diagonal strut assembly at said second pivot means.

6. The invention as defined in claim 1 wherein said support plate assembly includes automatic locking means adapted to automatically lockingly engage the kingpin depending from the underside of the trailer.

7. The invention as defined in claim 6 wherein said automatic locking means includes manually operable means for releasing said lockingly engageable means.

8. A stanchion for hitching and supporting a trailer on a railway car comprising a support plate assembly, a support structure pivotally supporting said support plate assembly and movable between a collapsed position and an erect operative position, said support structure including a vertical strut means pivotal about a first pivot means and a diagonal strut means pivotal about a second pivot means, said diagonal strut means including an upper diagonal strut member and a lower diagonal strut member, said upper diagonal strut member and said lower diagonal strut member being arranged to telescope longitudinally relative to each other, and means disposed between said telescoping upper diagonal strut member and said lower diagonal strut member for lengthening and shortening the effective length of said diagonal strut means so that upon shortening of said diagonal strut means said vertical strut means is raised from a substantially horizontal position assumed in said collapsed position of said support structure to a substantially vertical position thereby to form with said diagonal strut means a substantially right triangular support assumed in said erect operative position of said support structure, and means for releasably locking said upper diagonal strut member and said lower diagonal strut member at a selective length in the erect operative position thereof.

9. A stanchion for hitching and supporting a trailer on a railway car comprising a base, a support plate assembly, a support structure pivotally supporting said support plate assembly and movable between a collapsed position and an erect operative position, said support structure including a vertical strut means pivotal about a first pivot means fixed to said base and a diagonal strut means pivotal about a second pivot means mounted on said base, said diagonal strut means including an upper diagonal strut member and a lower diagonal strut member, said upper diagonal strut member and said lower diagonal strut member being arranged to telescope longitudinally relative to each other, and means disposed between said telescoping upper diagonal strut member and said lower diagonal strut member for lengthening and shortening the effective length of said diagonal strut means so that upon shortening of said diagonal strut means said vertical strut means is raised from a substantially horizontal position assumed in said collapsed position of said support structure to a substantially vertical position thereby to form with said diagonal strut means a substantially right triangular support assumed in said erect operative position of said support structure.

10. The invention as defined in claim 8 wherein the upper end of said diagonal strut member is pivotally connected to said support plate assembly to form the apex of a triangle with the upper end of said vertical strut in the erect operative position of said support structure, and the lower end of said lower diagonal strut member is pivotally connected to said second pivot means.

11. The invention as defined in claim 10 wherein said lower ends of said lower diagonal strut member are pivotally connected to a cushion device for absorbing a portion of the shock of impact applied to the railway car.

12. A stanchion for hitching and supporting a trailer on a railway car comprising a base, a support plate assembly, a support structure pivotally supporting said support plate assembly and movable between a collapsed position and an erect operative position, said support structure including a vertical strut means of a substantially fixed length and pivotal about a first fixed pivot means on said base and further including a diagonal strut means pivotal about a second pivot means on said base and which is spaced lengthwise of said first fixed pivot means, said diagonal strut means including an upper diagonal strut member and a lower diagonal strut member, said upper diagonal strut member and said lower diagonal strut member being arranged to telescope longitudinally relative to each other, and means disposed between said telescoping strut means for lengthening and shortening the effective length of said diagonal strut means so that upon shortening of said diagonal strut means said vertical strut means is raised from a substantially horizontal position assumed in said collapsed position of said support structure to a substantially vertical position forming with said diagonal strut means a substantially right triangular support assumed in said erect operative position of said support structure.

13. The invention as defined in claim 12 including a cushion means mounted on said base and connected to said second pivot means for cushioning forces of impact imposed on said stanchion.

14. A stanchion for hitching a trailer on a railway car, said stanchion comprising a base, a vertical strut pivotally connected at one end to said base, a diagonal strut assembly including a lower strut means having transversely spaced strut legs, an upper strut means including transversely spaced upper strut means telescopingly received within said lower strut means, means pivotally connecting said lower strut means to said base, means pivotally connecting said upper strut means to said other end of said vertical strut, and elevating means connecting said upper and lower strut means to telescopingly extend and contract said upper strut means relatively to said lower strut means.

15. The invention as defined in claim 14 wherein said elevating means comprises a continuous length screw means having one end mounted on said lower strut means and the other end mounted on said upper strut means.

16. The invention as defined in claim 15 wherein said end of said screw means mounted on said upper strut means includes braking means for preventing free reversal of the direction of turning of said screw means during relative contraction of said upper strut means to said lower strut means.

17. The invention as defined in claim 14 wherein said upper and lower strut means includes releasable locking means operative at a predetermined position of said upper strut means relative to said lower strut means to lock said upper strut means against extension relative to said lower strut means.

References Cited in the file of this patent

UNITED STATES PATENTS

| | | |
|---|---|---|
| 2,687,268 | Hawes | Aug. 24, 1954 |
| 3,041,028 | McDowell | June 26, 1962 |

FOREIGN PATENTS

| | | |
|---|---|---|
| 830,410 | Great Britain | Mar. 16, 1960 |